United States Patent
Sampei

(10) Patent No.: US 9,836,902 B2
(45) Date of Patent: Dec. 5, 2017

(54) COMMUNICATION SYSTEM, COMMUNICATION METHOD, AND CONTROL DEVICE

(71) Applicant: ALPS ELECTRIC CO., LTD., Tokyo (JP)

(72) Inventor: Yoshio Sampei, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 2 days.

(21) Appl. No.: 15/090,391

(22) Filed: Apr. 4, 2016

(65) Prior Publication Data
US 2016/0307384 A1    Oct. 20, 2016

(30) Foreign Application Priority Data

Apr. 14, 2015    (JP) ................................. 2015-082604

(51) Int. Cl.
*G07C 9/00* (2006.01)
*H04B 7/06* (2006.01)
*H01Q 1/32* (2006.01)
*H01Q 21/29* (2006.01)

(52) U.S. Cl.
CPC ..... *G07C 9/00309* (2013.01); *G07C 9/00007* (2013.01); *H01Q 1/3241* (2013.01); *H04B 7/0604* (2013.01); *G07C 2009/00769* (2013.01); *H01Q 1/3291* (2013.01); *H01Q 21/29* (2013.01)

(58) Field of Classification Search
CPC ...... G07C 2009/00769; G07C 9/00007; G07C 9/00309; H01Q 1/3241; H01Q 1/3291; H01Q 21/29; H04B 7/0604
See application file for complete search history.

(56) References Cited

U.S. PATENT DOCUMENTS

| | | | |
|---|---|---|---|
| 6,263,200 B1 * | 7/2001 | Fujimoto | H04W 52/0245 455/343.5 |
| 7,181,189 B2 | 2/2007 | Hotta et al. | |
| 8,222,992 B2 | 7/2012 | Nishiguchi et al. | |
| 2001/0028296 A1 * | 10/2001 | Masudaya | G07C 9/00309 340/5.61 |
| 2004/0080415 A1 * | 4/2004 | Sorensen | G01V 3/12 340/541 |

FOREIGN PATENT DOCUMENTS

| | | |
|---|---|---|
| JP | 2005-207223 | 8/2005 |
| JP | 2010-219628 | 9/2010 |

\* cited by examiner

*Primary Examiner* — Yong Hang Jiang
(74) *Attorney, Agent, or Firm* — Beyer Law Group LLP

(57) ABSTRACT

If a portable device receives a request signal from a control device that requires a response from the portable device, a first response signal is transmitted from the portable device during a common period defined in all portable devices. Thus, in a case where there is no portable device which enables wireless communication with the control device, a value of received signal strength indication of a wireless signal which is received from the portable device by the control device is very small and becomes smaller than the threshold value during a period in the common period. In this case, the control device suspends reception processing of causing a signal to be transmitted from the plurality of portable devices subsequently to the first response signal.

7 Claims, 10 Drawing Sheets

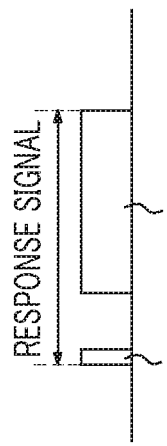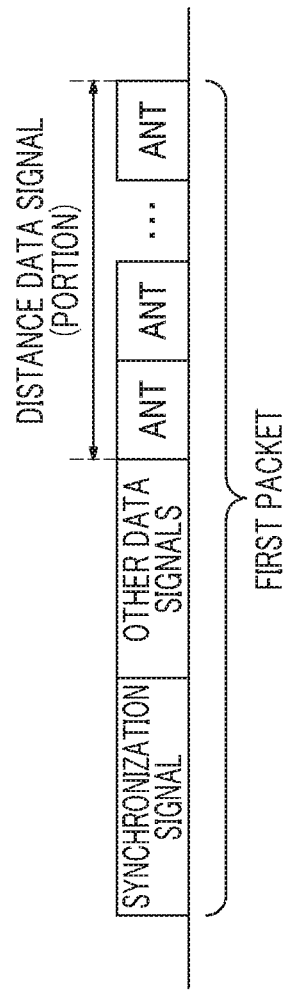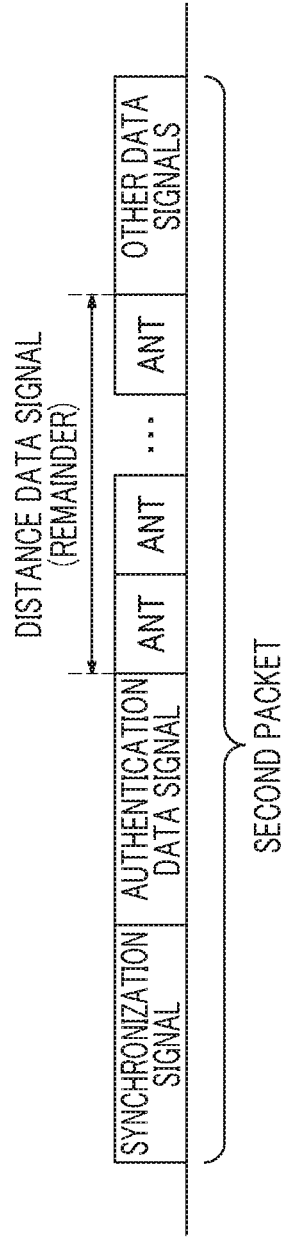

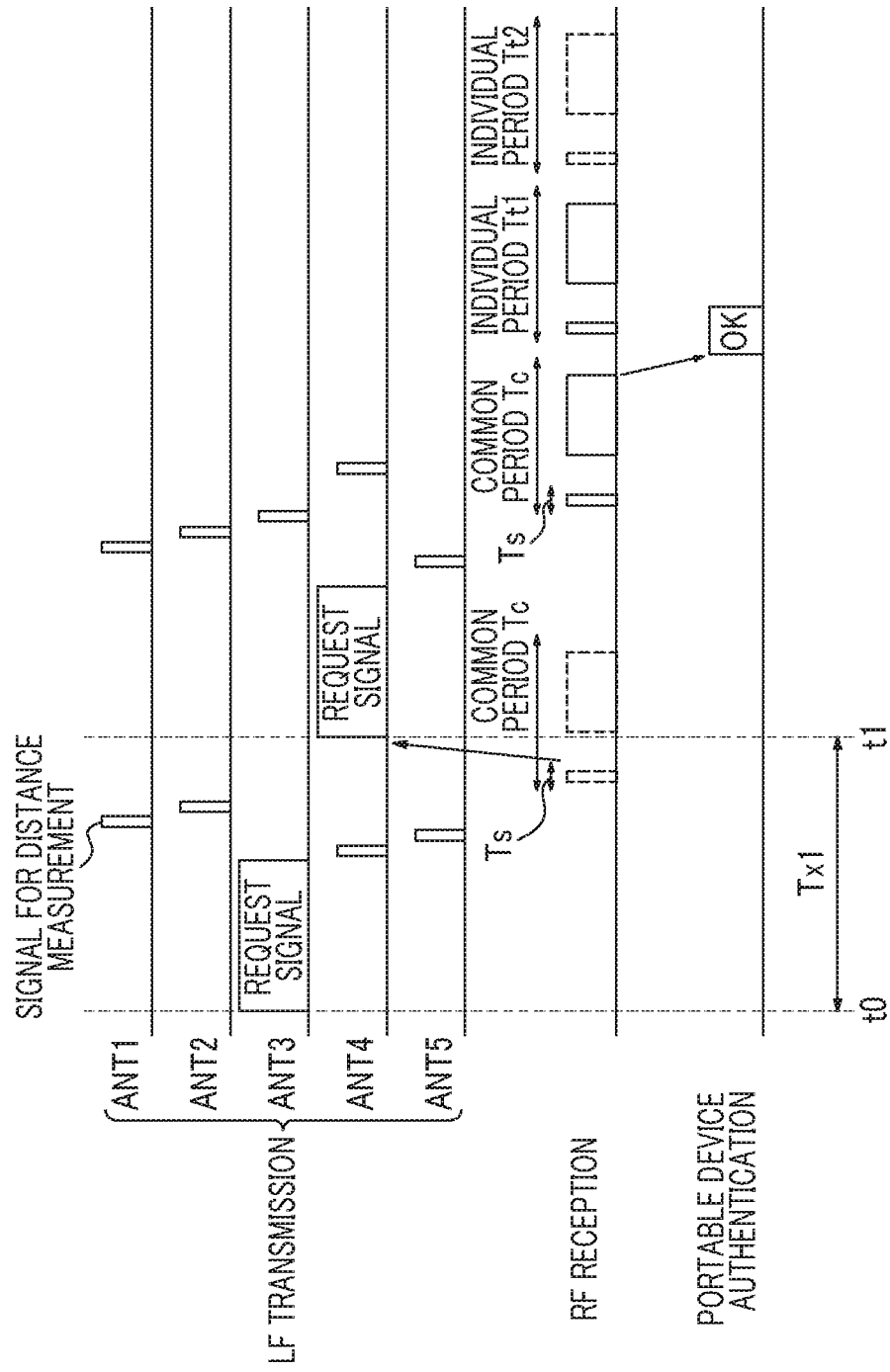

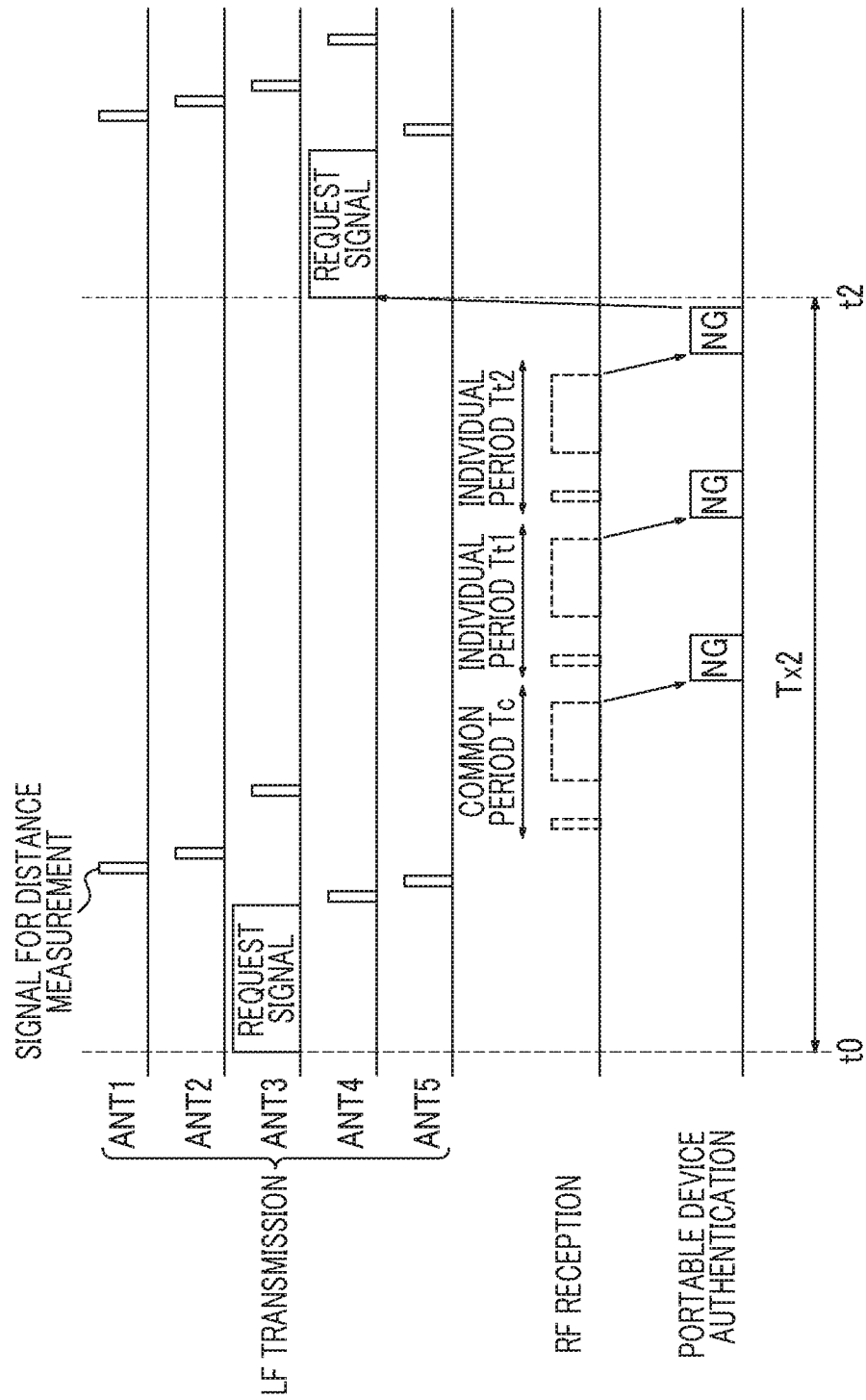

COMMUNICATION SYSTEM, COMMUNICATION METHOD, AND CONTROL DEVICE

CLAIM OF PRIORITY

This application claims benefit of Japanese Patent Application No. 2015-082604 filed on Apr. 14, 2015, which is hereby incorporated by reference.

BACKGROUND OF THE INVENTION

1. Field of the Invention

The present invention relates to a communication system in which wireless communication is performed between a control device mounted in a vehicle and a plurality of portable devices, that is, to the communication system such as a keyless entry system in which a door is locked or unlocked based on wireless communication between the in-vehicle control device and the portable device, for example.

2. Description of the Related Art

A keyless entry system is known in the related art (for example, see Japanese Unexamined Patent Application Publication No. 2010-219628). In the keyless entry system, an operation for a vehicle, such as locking or unlocking of a door of the vehicle, and a start of an engine is performed based on wireless communication between an in-vehicle control device and a portable device. The portable device receives a request signal from the in-vehicle control device and transmits a response signal, and thereby authentication processing is performed. In addition, a passive•keyless entry system has also been widely used. In the passive•keyless entry system, an operation for a vehicle, such as unlocking of a door is permitted in a case where it is determined that a portable device which has transmitted a request signal is a portable device which has been registered in advance on the in-vehicle control device, and thus the authentication succeeds.

In a general passive•keyless entry system, a plurality of antennae is disposed at positions of a vehicle. In a case where communication in a passive mode is started, firstly, an in-vehicle control device selects one antenna from the plurality of antennae, and a signal (LF signal) in a LF band is transmitted from the selected antenna. The transmitted LF signal includes a signal for causing a start of the portable device or data for authentication. If the portable device receives the LF signal, a signal (RF signal) in a RF band, which includes data for authentication is transmitted to the in-vehicle control device from the portable device. The in-vehicle control device performs authentication of whether or not the portable device is a portable device which has been registered in advance, based on the RF signal transmitted from the portable device. If the portable device passes the authentication, a control of the vehicle, such as unlocking of the door, is permitted. In a case where receiving the RF signal from the portable device is not possible, or in a case where the received RF signal does not pass the authentication, the in-vehicle control device selects another antenna and transmits the LF signal again.

However, in a case where a plurality of portable devices is registered in the in-vehicle control device, if RF signals for responding to the LF signal are transmitted from the plurality of portable devices so as to overlap each other in time domain, normal reception of the RF signals by the in-vehicle control device may not be possible. In order to avoid such circumstances, generally, a method in which transmission periods of the RF signals for the portable devices are assigned in advance so as not to overlap each other, and the RF signals are transmitted from the portable device in order has been employed.

However, this method has a problem in that as the number of registered portable devices is increased, a period of time required for determination of a state (non-existence state of the portable device) in which there is no portable device near to an antenna becomes longer. That is, if reception processing is continuously performed until the last transmission period for all registered portable devices and thus it is finally confirmed that receiving the RF signal is not possible, conclusive determination of "the non-existence state of the portable device" is impossible. As a result, in "the non-existence state of the portable device", a period of time from when the LF signal is transmitted through one antenna until the one antenna is switched to another antenna and the LF signal is retransmitted becomes longer. For example, there is a case where because the portable device is in the rear portion of the vehicle, receiving the RF signal through an antenna in the front portion of the vehicle is not possible, and thus the antenna is switched to an antenna in the rear portion of the vehicle, so as to transmit the LF signal. In this case, the door is not rapidly unlocked, and thus, convenience is lowered.

In the control system disclosed in Japanese Unexamined Patent Application Publication No. 2010-219628, firstly, a response signal (RF signal) to a request signal (LF signal) transmitted from an in-vehicle system is transmitted from a plurality of portable devices at a common timing. Then, a response signal (RF signal) to the request signal (LF signal) is transmitted from each of the portable devices at an individual timing thereof. Thus, in a case where only one portable device is near to an antenna, the in-vehicle system receives the first response signal which has been transmitted at the common timing normally. Accordingly, even when a plurality of registered portable devices is provided, the response signal of the portable device is received normally by the in-vehicle system during the shortest period of time. In a case where a plurality of portable devices is provided, a response signal is transmitted from each of the portable devices at the individual timing thereof, and thus the response signal from each of the portable devices is received normally by the in-vehicle system.

However, even in the control system disclosed in Japanese Unexamined Patent Application Publication No. 2010-219628, the above-described problem in that as the number of registered portable devices is increased, the period for determination of "the non-existence state of the portable device" becomes longer is not solved. That is, if response signals have been continuously received until an individual timing of the last portable device among all registered portable devices, conclusive determination of "the non-existence state of the portable device" is impossible. Thus, in a case where an antenna is switched in order to receive a response signal from a portable device which is in a vehicle, the control of the vehicle, such as unlocking of a door is delayed longer as the number of registered portable devices is increased.

SUMMARY OF THE INVENTION

The present invention provides a communication system, a communication method, and a control device which can reduce a period of a delay in processing of the control device due to continuous performing of reception processing from a plurality of portable devices in a case of being in a state where receiving a response signal to a request signal from a control device mounted in a vehicle, from the plurality of portable devices which are to transmit the response signal is not possible.

A first aspect of the present invention relates to a communication system in which wireless communication between a control device mounted in a vehicle and a plurality of portable devices is enabled. In the communication system, the control device includes a first transmission unit, a first reception unit, and a first control unit. The first transmission unit transmits a wireless signal to the portable devices. The first reception unit receives a wireless signal from the portable devices. The first control unit performs transmission processing of causing a request signal for requiring a response from each of the portable devices to be transmitted from the first transmission unit. Each of the portable devices includes a second transmission unit, a second reception unit, and a second control unit. The second transmission unit transmits a wireless signal to the control device. The second reception unit receives a wireless signal from the control device. The second control unit causes a first response signal to be transmitted from the second transmission unit during a common period defined in all of the portable devices, in a case where the second reception unit receives the request signal. The first control unit of the control device compares a value of received signal strength indication in the first reception unit during the common period, to a threshold value after the transmission processing. If the value of the received signal strength indication is smaller than the threshold value, the first control unit suspends reception processing for causing the first reception unit to receive a signal required to be transmitted from the plurality of portable devices, subsequently to the first response signal.

According to the above configuration, if the portable device receives the request signal from the control device which requires a response from the portable device, the first response signal is transmitted from the portable device during the common period defined in all of the portable devices. Thus, in a case where there is no portable device which enables wireless communication with the control device, a value of received signal strength indication of a wireless signal which is received from the portable device by the control device is very small and becomes smaller than the threshold value during the common period. In this case, the control device suspends reception processing for receiving a signal required to be transmitted from the plurality of portable devices subsequently to the first response signal. Accordingly, a period of a delay occurring in processing of the control device due to the endlessly continuing reception processing is reduced.

Preferably, the control device may include a plurality of antennae. The first control unit of the control device may repeat the transmission processing by using an antenna which is different from an antenna which has been used in the previous time, in a case where the reception processing is suspended based on a result of comparison that the value of the received signal strength indication is smaller than the threshold value.

According to the above configuration, in a case where there is no portable device which transmits a response to the request signal received by using one antenna, so as to enable wireless communication with the control device, the control device suspends the reception processing which is used for receiving a signal from the portable device, and is useless in this case, and the control device repeats the transmission processing of transmitting the request signal to the portable devices by using an antenna which is different from the one antenna. Thus, an antenna which enables transmission of the request signal to the portable devices is rapidly selected from the plurality of antennae. As a result, wireless communication between the portable devices and the control device is rapidly established.

Preferably, the second control unit of the portable device may cause a second response signal to be transmitted from the second transmission unit during an individual period which is defined for each of the portable devices, after transmitting the first response signal during the common period. The first control unit of the control device may perform the reception processing for causing the first reception unit to receive the second response signal to be transmitted from each of the plurality of portable devices during the individual period thereof, if normal reception of the first response signal by the first reception unit is not possible during the common period and the received signal strength indication is greater than the threshold value, after the transmission processing.

According to the above configuration, after the transmission processing of transmitting the request signal to the portable device from the control device, in a case where normal reception of the first response signal from the portable device during the common period is not possible, and the value of the received signal strength indication of a wireless signal received from the portable device is greater than the threshold value, first response signals may be simultaneously transmitted from two or more portable devices during the common period. In this case, because the control device performs the reception processing for receiving second response signals to be transmitted from the plurality of portable devices during the individual periods thereof, reception error does not occur due to simultaneous transmission of the second response signals from the portable devices, and reception in the control device is performed normally.

Preferably, the first control unit of the control device may perform the reception processing for causing the first reception unit to receive the second response signal to be transmitted from each of the plurality of portable devices during the individual period thereof, in a case where the normal reception of the first response signal by the first reception unit is possible during the common period after the transmission processing.

Thus, since a response signal to the request signal is received twice from the portable device in the control device, the incidence of the reception errors is reduced, and communication quality is improved.

Preferably, the second control unit of the portable device may divide the first response signal into two packets and cause the two packets to be transmitted from the second transmission unit. The first control unit of the control device may compare the value of the received signal strength indication of the first reception unit to the threshold value during a period when the leading packet in the first response signal is to be transmitted in the common period.

Thus, since the received signal strength indication of which the value exceeds the threshold value is detected during a relatively short period when the leading packet is transmitted, a comparison result between the value of the received signal strength indication in the first reception unit and the threshold value is obtained at an early timing. Accordingly, a period of a delay occurring in processing of the control device due to the endlessly continuing reception processing is reduced more.

A second aspect of the present invention relates to a control device mounted in a vehicle. The control device includes a first transmission unit, a first reception unit, and a first control unit. The first transmission unit transmits a wireless signal to a plurality of portable devices. The first reception unit receives a wireless signal from each of the portable devices. The first control unit performs transmission processing of causing a request signal for requiring a response from each of the portable device to be transmitted from the first transmission unit. After the transmission processing, the first control unit compares a value of received signal strength indication of the first reception unit to a threshold value during a common period when all of the portable device are needed to transmit a first response signal to the request signal. If the value of the received signal strength indication is smaller than the threshold value, the first control unit suspends reception processing of causing the first reception unit to receive a signal required to be transmitted from each of the plurality of portable devices subsequently to the first response signal.

Preferably, the control device may include a plurality of antennae. The first control unit may repeat the transmission processing by using the antenna different from the antenna which has been used in the previous time, in a case where the reception processing is suspended based on a result of comparison that the value of the received signal strength indication is smaller than the threshold value Preferably, after the transmission processing, the first control unit may perform the reception processing for causing the first reception unit to receive a second response signal to be transmitted from each of the plurality of portable devices during an individual period defined for each of the portable devices, if normal reception of the first response signal by the first reception unit is not possible and the value of the received signal strength indication is greater than the threshold value during the common period.

A third aspect of the present invention relates to a communication method of enabling wireless communication between a control device mounted in a vehicle and a plurality of portable devices. In the communication method, the control device performs transmission processing of transmitting a request signal for requiring a response from the portable device. A first response signal is transmitted during a common period defined for all of the portable devices, in a case where the portable devices receive the request signal. After the transmission processing, the control device compares a value of received signal strength indication of a wireless signal received from the portable device during the common period to a threshold value. If the value of the received signal strength indication is smaller than the threshold value, the control device suspends reception processing for receiving a signal required to be transmitted from the plurality of portable devices subsequently to the first response signal.

BRIEF DESCRIPTION OF THE DRAWINGS

FIGS. 5A to 5C are diagrams illustrating an example of a response signal (first response signal, second response signal) which is transmitted to the control device from the portable device;

FIG. 6 is a timing chart illustrating an example of an operation of the communication system according to the embodiment of the present invention;

FIG. 7 is a timing chart illustrating a comparative example of the operation of the communication system illustrated in FIG. 6;

DESCRIPTION OF THE PREFERRED EMBODIMENTS

Figure 1:
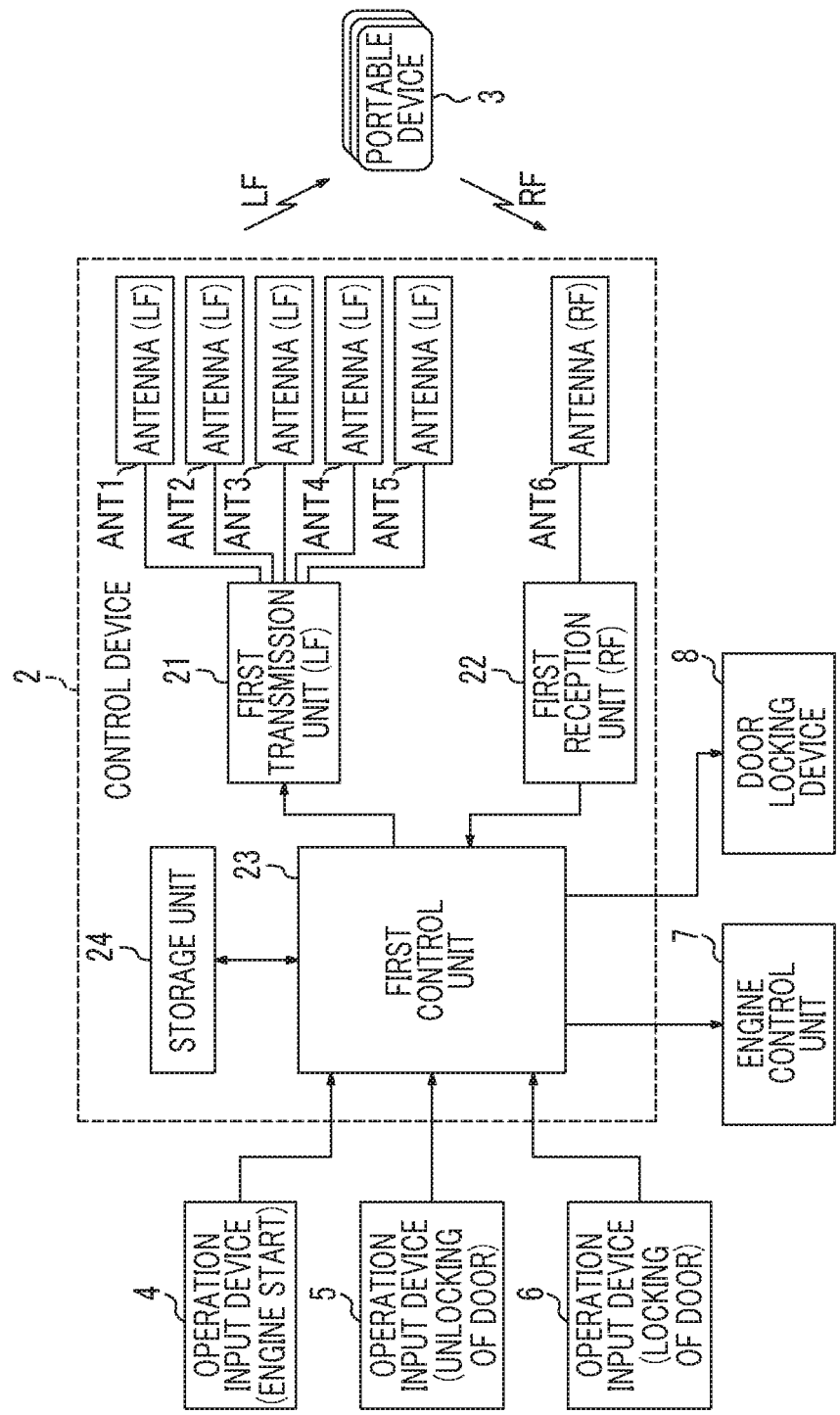
FIG. 1 is a diagram illustrating an example of a configuration of a communication system according to an embodiment of the present invention.

FIG. 1 is a diagram illustrating an example of a configuration of a communication system according to an embodiment of the present invention. The communication system illustrated in FIG. 1 is a passive•keyless entry system, and includes a control device 2 mounted in a vehicle 1, and a plurality of portable devices 3 which is held by a user and enables an operation.

The communication system illustrated in FIG. 1 is operated schematically as follows. First, if an operation input device (engine start button and the like) of the vehicle 1 is operated by a user who holds the portable device 3, a request signal in a LF band is transmitted to the portable device 3 from the control device 2 of the vehicle 1. If the portable device 3 receives the request signal, a response signal in a RF band is transmitted to the control device 2 from the portable device 3. The control device 2 performs authentication processing of determining whether or not the portable device 3 is a device which has been registered in advance, based on the response signal which is received from the portable device 3. In a case where the portable device 3 is a device which has been registered in advance, predetermined vehicle control (start of the engine and the like) in accordance with an operation of the operation input device is performed in the vehicle 1.

The control device 2 may register a plurality of portable devices 3 beforehand and performs vehicle control such as unlocking or locking of a door and a start of the engine, based on wireless communication with the registered portable device 3.

For example, as illustrated in FIG. 1, the control device 2 includes a first transmission unit 21, antennae ANT1 to ANT5 connected to the first transmission unit 21, a first reception unit 22, an antenna ANT6 connected to the first reception unit 22, a first control unit 23, and a storage unit 24.

The first transmission unit 21 transmits a wireless signal in the LF band to the portable device 3. That is, the first transmission unit 21 performs predetermined signal processing (for example, coding, modulation, amplification, and the like) on transmission data generated in the first control unit 23, so as to generate a signal in the LF band, and transmits the generated signal as a wireless signal from the antennae ANT1 to ANT5. In this case, the first transmission unit 21 selects any one of the antennae ANT1 to ANT5 and transmits a wireless signal from the selected antenna, in accordance with control of the first control unit 23.

Figure 2:
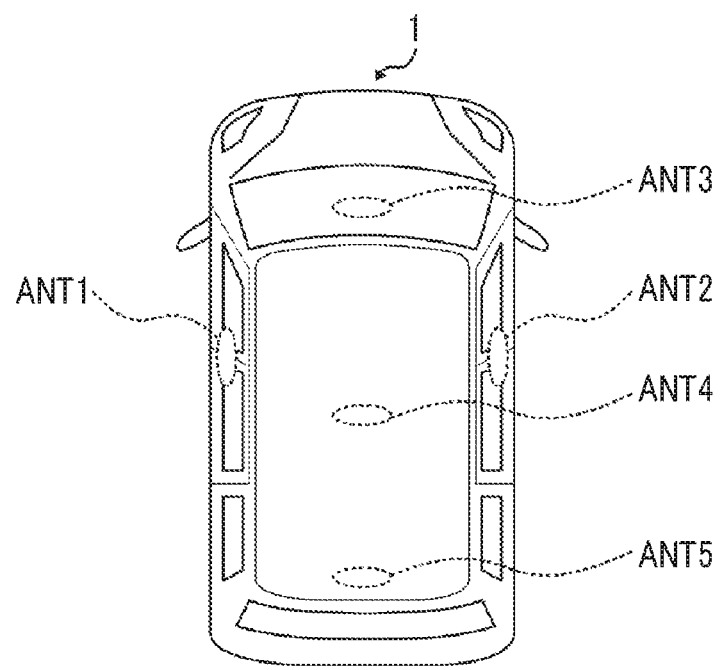
FIG. 2 is a diagram illustrating an example of an installation position of an antenna in a vehicle.

FIG. 2 is a diagram illustrating an example of installation positions of the antennae ANT1 to ANT5 in the vehicle 1. In the example of FIG. 2, the antenna ANT1 is installed in the vicinity of the left-side door, the antenna ANT2 is installed in the vicinity of the right-side door, the antenna ANT5 is installed at the front portion in the vehicle 1, the antenna ANT4 is installed at the center portion in the vehicle 1, and the antenna ANT5 is installed at the rear portion in the vehicle 1.

The first reception unit 22 receives a wireless signal in the RF band, which is transmitted from the portable device 3. That is, the first reception unit 22 generates reception data by performing predetermined signal processing (for example, amplification, demodulation, decoding, and the like) on the signal in the RF band, which is received through the antenna ANT6. The first reception unit 22 outputs the generated reception data to the first control unit 23.

The first control unit 23 is a circuit configured to generally control processing of the control device 2. For example, the first control unit 23 includes a computer (microprocessor and the like) of conducting a command based on a program stored in the storage unit 24, or a dedicated logic circuit (ASIC and the like).

If an operation of a user for an instruction of the vehicle control such as the start of the engine, or unlocking•locking of the door is input by operation input devices 4 to 6 which are provided in the vehicle 1, the first control unit 23 performs wireless communication with the portable device 3 by using the first transmission unit 21 and the first reception unit 22.

In the wireless communication, firstly, the first control unit 23 performs transmission processing of causing a request signal in the LF band for requiring a response from the portable device 3 to be transmitted from the first transmission unit 21. In this case, the first control unit 23 uses one antenna selected from the antennae ANT1 to ANT5, for transmission of the request signal.

The first control unit 23 performs processing of causing a signal for distance measurement to be transmitted from the first transmission unit 21, subsequently to the transmission processing for the request signal. The signal for distance measurement is used for determining a position of the portable device 3. In this case, the first control unit 23 selects the antennae ANT1 to ANT5 in a predetermined order, and causes the signal for distance measurement to be transmitted from the selected antenna. As will be described later, the portable device 3 acquires a distance from each of the antennae ANT1 to ANT5, based on received signal strength indication of a distance measurement signal which is transmitted from each of the antennae ANT1 to ANT5.

After the above-described transmission processing for the request signal, the first control unit 23 causes the first reception unit 22 to receive a first response signal in the RF band, which is transmitted from the portable device 3 during a common period Tc (described as "a common period Tc" below). The common period Tc is defined as a period when all of the portable devices 3 need to transmit a predetermined response signal (first response signal) to the request signal. For example, the first control unit 23 sets a fixed period after a predetermined period elapses from a point of time when the first transmission unit 21 transmits the request signal, as the common period Tc. The first control unit 23 waits for reception of the first response signal from each of the portable devices 3.

In a case where the first response signal can be received normally during the common period Tc (for example, in a case where it can be confirmed that a signal received by the first reception unit 22 is the first response signal configured in accordance with a predetermined format), the first control unit 23 performs the authentication processing of determining whether or not the portable device 3 as a transmission source is a portable device 3 which has been registered in advance, based on data for authentication which is included in the received first response signal.

The sentence in that the first response signal can be received normally during the common period Tc means that first response signals from a plurality of portable devices 3 do not collide with each other during the common period Tc. Thus, there is a probability of only one portable device 3 transmitting the first response signal. In this case, the first control unit 23 performs the authentication processing for the portable device 3, based on the first response signal which can be received normally. For example, the first control unit 23 inquires pieces of individual discrimination information of a plurality of portable devices 3, which are stored in the storage unit 24 in advance, and inquires individual discrimination information which is acquired from the first response signal. In a case where the individual discrimination information acquired from the first response signal matches with the individual discrimination information stored in the storage unit 24, the first control unit 23 determines that the portable device 3 passes authentication.

The first control unit 23 performs position determination processing of determining a position of the portable device 3 with respect to the vehicle 1, based on distance data which is included in the first response signal and indicates a distance from each of the antennae (AT1 to AT5). For example, the first control unit 23 determines whether or not the portable device 3 is in a vehicle, on the outside of the vehicle, or is in a predetermined surrounding range of the vehicle 1.

In a case where the portable device 3 as a transmission source of the first response signal passes the authentication, and a determination result of a position of the portable device 3 satisfies a predetermined condition, the first control unit 23 performs the vehicle control in accordance with an operation of the operation input devices 4 to 6 such as buttons and a touch panel. Specifically, the first control unit 23 outputs a control signal for an instruction of a start of the engine to an engine control unit 7 of the vehicle 1, in a case where the operation input device 4 is operated. In a case where the operation input device 5 is operated, the first control unit 23 outputs a control signal for an instruction of unlocking of the door to a door locking device 8 of the vehicle 1. In a case where the operation input device 6 is operated, the first control unit 23 outputs a control signal for an instruction of locking of the door to the door locking device 8 of the vehicle 1.

The first control unit 23 compares a value of received signal strength indication in the first reception unit 22, to a predetermined threshold value during the common period Tc. For example, the first control unit 23 compares the value of the received signal strength indication to the threshold value during a period when a first packet (FIG. 5) (which will be described later) of the first response signal is to be transmitted.

In a case where the value of the received signal strength indication in the common period Tc is greater than the threshold value, but normal reception of the first response signal is not possible, the first response signals from the plurality of portable devices 3 may collide with each other during the common period Tc. In this case, the first control unit 23 performs reception processing for causing the first transmission unit 21 to receive second response signals which are to be transmitted from a plurality of portable devices 3 subsequently to the first response signal. The second response signal is a signal transmitted from each of the plurality of portable devices 3 during an individual period Tt (described as "an individual period Tt" below) which is defined for each of the portable devices 3. The second response signal includes data for authentication and distance data which are the same as those in the first response signal. Because the second response signals are transmitted during individual periods Tt different for each of the portable devices 3, collision as with the first response signals do not occur even when a plurality of portable devices 3 is provided. For example, the first control unit 23 sets a fixed period after each of predetermined periods elapses from a point of time when the first transmission unit 21 transmits the request signal, as the individual period Tt of each of the portable devices 3. The first control unit 23 waits for reception of the second response signal in each of the individual periods Tt. The first control unit 23 performs authentication processing and position determination processing which are similar to the above descriptions, based on the second response signal received from the portable device 3. In a case where any portable device 3 passes the authentication and a position determination result satisfies a predetermined condition, the first control unit 23 performs the vehicle control (start of the engine and the like) in accordance with an operation of the operation input devices 4 to 6, similarly to the above descriptions.

A case where the value of the received signal strength indication in the common period Tc is smaller than the threshold value means that the first response signal from the portable device 3 during the common period Tc does not reach the antenna. Thus, there is a probability of the portable device 3 not being near to the currently-used antenna. In this case, the first control unit 23 suspends the above-described reception processing for receiving the second response signals to be sequentially transmitted from the plurality of portable devices 3 subsequently to the first response signal.

In a case where the first control unit 23 suspends the reception processing for the second response signal, the first control unit 23 repeats the transmission processing of causing a request signal to be transmitted from the first transmission unit 21, by using an antenna (AT1 to AT5) different from an antenna used in the previous time. The first control unit 23 also repeats processing of causing the signal for distance measurement for determining a position of the portable device 3 to be transmitted from each of the antennae ANT1 to ANT5, subsequently to the transmission processing for the request signal. In this case, processing of receiving a response signal (first response signal, second response signal) from the portable device 3 in response to the request signal is similar to the above-described processing. The first control unit 23 performs the authentication processing and the position determination processing based on the received response signal (first response signal, second response signal). In a case where the portable device 3 passes the authentication and a position determination result satisfies a predetermined condition, the first control unit 23 performs the vehicle control (start of the engine and the like) in accordance with an operation of the operation input devices 4 to 6.

The storage unit 24 is a device that stores, for example, a program of the computer in the first control unit 23, data (individual discrimination information of each of the portable devices 3, and the like) which has been prepared for processing in advance, or data (random number data for cryptographic communication, and the like) which is temporarily held in the process of processing. The storage unit 24 includes a RAM, a non-volatile memory, a hard disk, or the like. The program or data stored in the storage unit 24 may be downloaded from a higher device through an interface device (not illustrated), or may be read from a non-temporary recording medium such as an optical disc or a USB memory.

Figure 3:
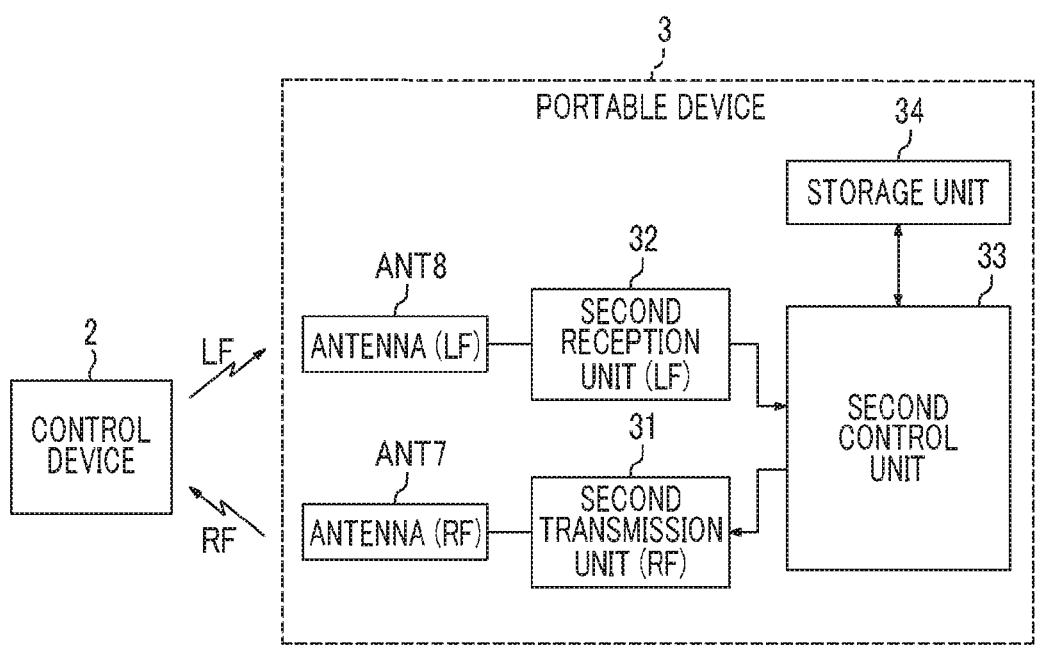
FIG. 3 is a diagram illustrating an example of a configuration of a portable device.

FIG. 3 is a diagram illustrating an example of a configuration of the portable device 3. The portable device 3 illustrated in FIG. 3 includes a second transmission unit 31, an antenna ANT1 connected to the second transmission unit 31, a second reception unit 32, an antenna ANT8 connected to the second reception unit 32, a second control unit 33, and a storage unit 34.

The second transmission unit 31 transmits a wireless signal in the RF band to the control device 2. That is, the second transmission unit 31 performs predetermined signal processing (for example, coding, modulation, amplification, and the like) on transmission data generated in the second control unit 33, so as to generate a signal in the RF band, and transmits the generated signal as a wireless signal from the antenna ANT1.

The second reception unit 32 receives a wireless signal in the LF band, which is transmitted from the control device 2. That is, the second reception unit 32 generates reception data by performing predetermined signal processing (for example, amplification, demodulation, decoding, and the like) on the signal in the LF band, which is received through the antenna ANT5. The second reception unit 32 outputs the generated reception data to the second control unit 33.

The second control unit 33 is a circuit configured to generally control processing of the portable device 3. For example, the second control unit 33 includes a computer (microprocessor and the like) of conducting a command based on a program stored in the storage unit 34, or a dedicated logic circuit (ASIC and the like).

In a case where the second reception unit 32 receives the above-described request signal from the control device 2, the second control unit 33 generates data for authentication subjected to processing such as encryption on the individual discrimination information, based on data for authentication included in the received request signal, and individual discrimination information of the portable device 3 stored in the storage unit 34.

If the second reception unit 32 receives the signal for distance measurement transmitted from each of the antennae (AT1 to AT5) of the control device 2, subsequently to the request signal, the second control unit 33 acquires a distance from each of the antennae (AT1 to AT5) based on received signal strength indication of the signal for distance measurement. For example, the second control unit 33 acquires distance data corresponding to the received signal strength indication based on a data table of the storage unit 34, in which the received signal strength indication and the distance data are correlated with each other.

The antenna ANT8 is configured by, for example, an omnidirectional antenna such as a three-axis antenna, in order to cause the received signal strength indication and the distance to have a fixed relationship without dependency on a direction or a posture of the portable device 3.

The second control unit 33 generates a first response signal including the data for authentication and the distance data, and causes the generated first response signal to be transmitted from the second transmission unit 31 during the common period Tc defined in all of the portable devices 3. For example, the second control unit 33 sets a fixed period after a predetermined period elapses from a point of time when the second reception unit 32 receives the request signal, as the common period Tc.

The second control unit 33 causes a second response signal to be transmitted from the second transmission unit 31 during the individual period Tt defined in each of the portable devices 3. The second response signal includes details the same as those of the first response signal. For example, the second control unit 33 sets a fixed period after a predetermined period elapses from a point of time when the second reception unit 32 receives the request signal, as the individual period Tt. The second control unit 33 may set the individual period Tt based on information which is stored in the storage unit 34 so as to be separate from the individual discrimination information. The second control unit 33 may set the individual period Tt based on the individual discrimination information.

The storage unit 34 is a device that stores, for example, a program of the computer in the second control unit 33, data (individual discrimination information of each of the portable devices 3, and the like) which has been prepared for processing in advance, or data (random number data for cryptographic communication, and the like) which is temporarily held in the process of processing. The storage unit 34 includes a RAM, a non-volatile memory, a hard disk, or the like. The program or data stored in the storage unit 34 may be downloaded from a higher device through an interface device (not illustrated), or may be read from a non-temporary recording medium such as an optical disc or a USB memory.

Figure 4:
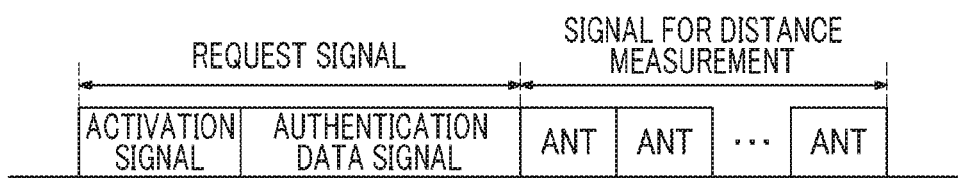
FIG. 4 is a diagram illustrating an example of a configuration of a request signal and a signal for distance measurement, which are transmitted to the portable device from a control device.

FIG. 4 is a diagram illustrating an example of the request signal and the signal for distance measurement which are transmitted to the portable device 3 from the control device 2. The request signal includes, for example, an activation signal and an authentication data signal, as illustrated in FIG. 4. The second control unit 33 of the portable device 3 is activated in accordance with the leading activation signal of the request signal, and performs the authentication processing or acquisition processing for position data. As illustrated in FIG. 4, the signal for distance measurement subsequent to the request signal is transmitted from each of the antennae ANT1 to ANT5 in a different period.

FIG. 5A to 5C are diagrams illustrating an example of the response signal (first response signal, second response signal) which is transmitted to the control device 2 from the portable device 3. As illustrated in FIG. 5A, for example, the response signal is formed from two packets (first packet and second packet). The first packet includes a synchronization signal, a portion of a distance data signal indicating distances from the antennae (AT1 to AT5), and other data signals. The second packet includes a synchronization signal, an authentication data signal, the remainder of the distance data signal of the antennae (AT1 to AT5), and other data signals.

An operation of the communication system having the above-described configuration will be described using the timing chart in FIG. 6.

If the operation input devices 4 to 6 are operated by a user, the control device 2 causes a request signal to be transmitted from one (antenna ANT3 in the example of FIG. 6) of the antennae ANT1 to ANT5 (point t0 of time). The control device 2 causes a signal for distance measurement to be transmitted from each of the antennae (ANT1 to ANT5) subsequently to transmission of the request signal.

After the request signal is transmitted from the antenna ANT3, the control device 2 compares a value of received signal strength indication of a RF signal to a predetermined threshold value during the common period Tc when a first response signal is to be transmitted from all of the portable devices 3. In the example of FIG. 6, the control device 2 compares the value of the received signal strength indication in a period Ts when a first packet of the first response signal is required to be transmitted, to the threshold value. Because the value of the received signal strength indication is smaller than the threshold value as a result of the comparison, the control device 2 suspends reception processing for a second packet of the first response signal and suspends reception processing for a second response signal which is required to be transmitted from the portable device 3 subsequently to the first response signal.

After the control device 2 suspends the reception processing for the response signal to the request signal, the control device 2 performs the transmission processing for the request signal again by using the antenna ANT4 which is different from the antenna ANT3 used in the previous time (point t1 of time). The control device 2 causes the signal for distance measurement to be transmitted from each of the antennae (AT1 to AT5) subsequently to transmission of the request signal.

After the request signal is transmitted from the antenna ANT4, the control device 2 compares a value of the received signal strength indication of the RF signal to the threshold value during the period Ts in the common period Tc when the first packet of the first response signal is required to be transmitted. Because the value of the received signal strength indication is greater than the threshold value as a result of the comparison, the control device 2 continuously performs the reception processing for the second packet of the first response signal. If the first packet and the second packet of the first response signal are received normally, the control device 2 performs the authentication processing for the portable device 3 based on authentication data included in the first response signal, and performs the position determination processing for the portable device 3 based on distance data from each of the antennas, which is included in the first response signal.

FIG. 7 is a timing chart illustrating a comparative example of the operation of the communication system illustrated in FIG. 6. The comparative example in FIG. 7 illustrates a case where the control device 2 does not compare the value of the received signal strength indication and the threshold value during the common period Tc, and continuously performs the reception processing during the individual period Tt even after the reception processing during the common period Tc. In this case, since there is not portable device 3 near to the antenna ANT3, the response signal is not received from any of the portable devices 3 during the common period Tc and the individual period Tt (in the example of FIG. 7, two individual periods Tt which respectively correspond to two registered portable devices 3). Thus, the authentication processing for the two registered portable devices 3 completely fails. In the comparative example of FIG. 7, the control device 2 finally determines that there is no portable device 3 near to the antenna ANT3, based on the failure of the authentication processing for all of the portable devices 3, and switches a transmission antenna for a LF signal from the antenna ANT3 to the antenna ANT4 (point t2 of time).

If periods until the transmission antenna for a LF signal is switched from the antenna ANT3 to the antenna ANT4 are compared to each other, the periods are a period corresponds to "Tx1" (t0 to t1) in the operation of the embodiment illustrated in FIG. 6 and a period corresponds to "Tx2" (t0 to t2) in the operation of the comparative example illustrated in FIG. 7. As found from the comparison of the periods, according to the embodiment illustrated in FIG. 6, the period required for switching of the transmission antenna for a LF signal is reduced in comparison to the comparative example illustrated in FIG. 7.

Next, the operation of the control device 2 in the communication system having the above-described configuration will be described with reference to flowcharts in FIGS. 8 and 9.

Figure 8:
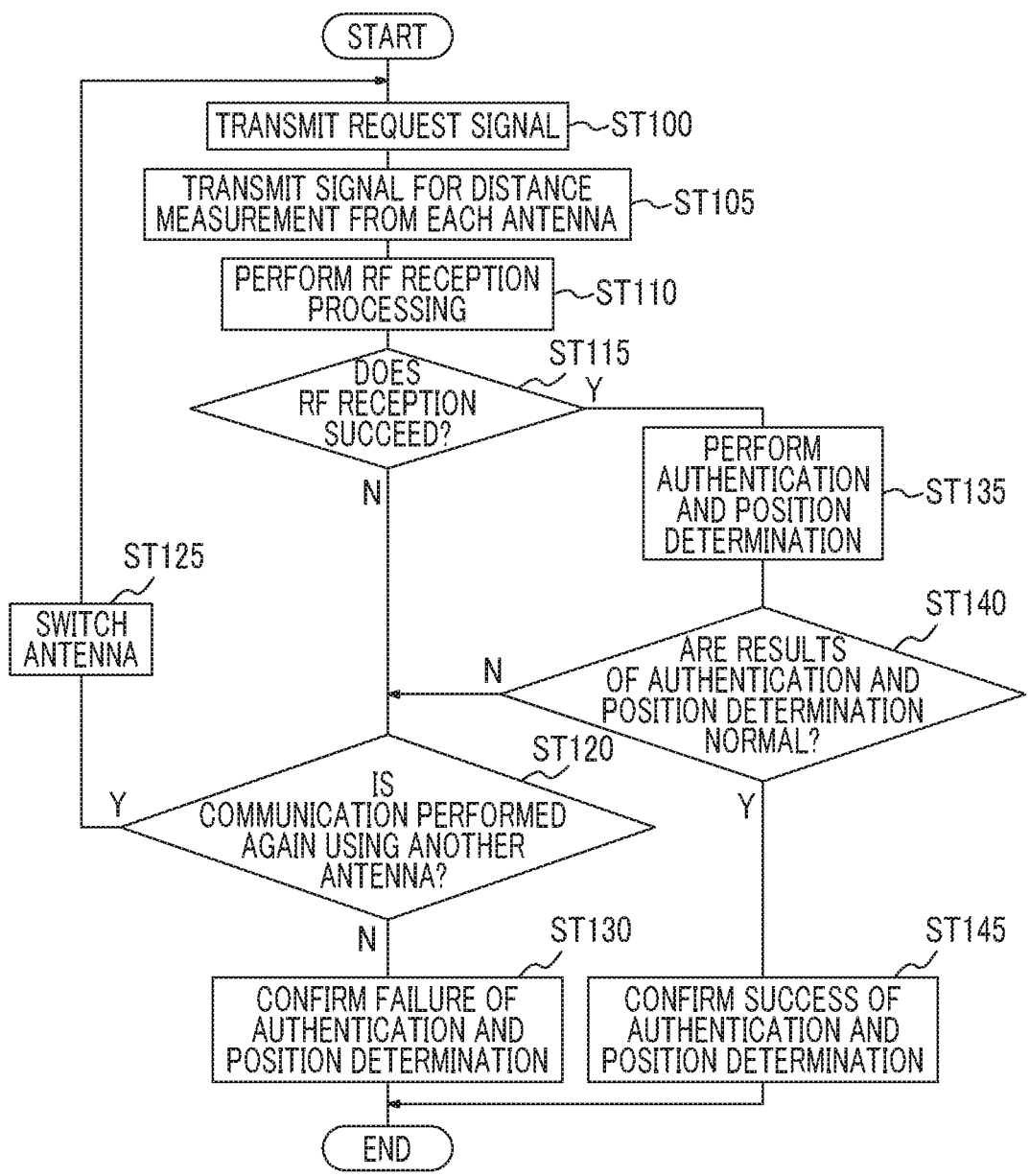
FIG. 8 is a flowchart illustrating an operation of the control device in the communication system according to the embodiment.

FIG. 8 is a flowchart illustrating an operation of the communication system in a case where the operation input devices 4 to 6 of the vehicle 1 are operated.

If the operation input devices 4 to 6 of the vehicle 1 are operated by a user, the control device 2 causes a request signal to be transmitted by using one of the antennae ANT1 to ANT5 (ST100). Subsequently to transmission of the request signal, the control device 2 causes a signal for distance measurement to be sequentially transmitted from the antennae ANT1 to ANT5 (ST105).

After the request signal and the signal for distance measurement are transmitted, the control device 2 performs the reception processing for a response signal (first response signal, second response signal) in the RF band, which is transmitted from the portable device 3 (ST110).

In a case (ST115) where the response signal (first response signal and second response signal) can be received normally from the portable device 3 in Step ST110, the control device 2 performs the authentication processing based on authentication data included in the received response signal, and performs the position determination processing based on position data included in the response signal (ST135). In a case where the portable device 3 as a transmission source of the response signal passes the authentication processing and a determination result of the position determination processing satisfies a predetermined condition, the control device 2 determines that success of the authentication processing and the position determination processing for the portable device 3 is confirmed, and performs the vehicle control (start of the engine, unlocking or locking of the door, and the like) in accordance with an operation of the operation input devices 4 to 6 (ST145).

In the case (ST115) where normal reception of the response signal from the portable device 3 in Step ST110 is not possible, in a case where the portable device 3 does not pass the authentication processing in Step ST140, or in a case (ST140) where a determination result of the position determination processing does not satisfy the predetermined condition, the control device 2 tries communication in the LF band with the portable device 3 again by using the antenna (AT1 to AT5) different from the antenna used in the previous time (ST120 and ST125). That is, in a case (ST120) where an antenna which has not been used in communication in the LF band remains, the control device 2 switches the antenna used in the previous time to a not-used antenna (ST125), and repeats the processes subsequent to the process of Step ST100. In a case (ST120) where communication in the LF band is performed by using all of the antennae, the control device 2 determines that failure of the authentication processing and the position determination processing for the portable device 3 is confirmed, and ends the process without performing of the vehicle control (ST130).

Figure 9:
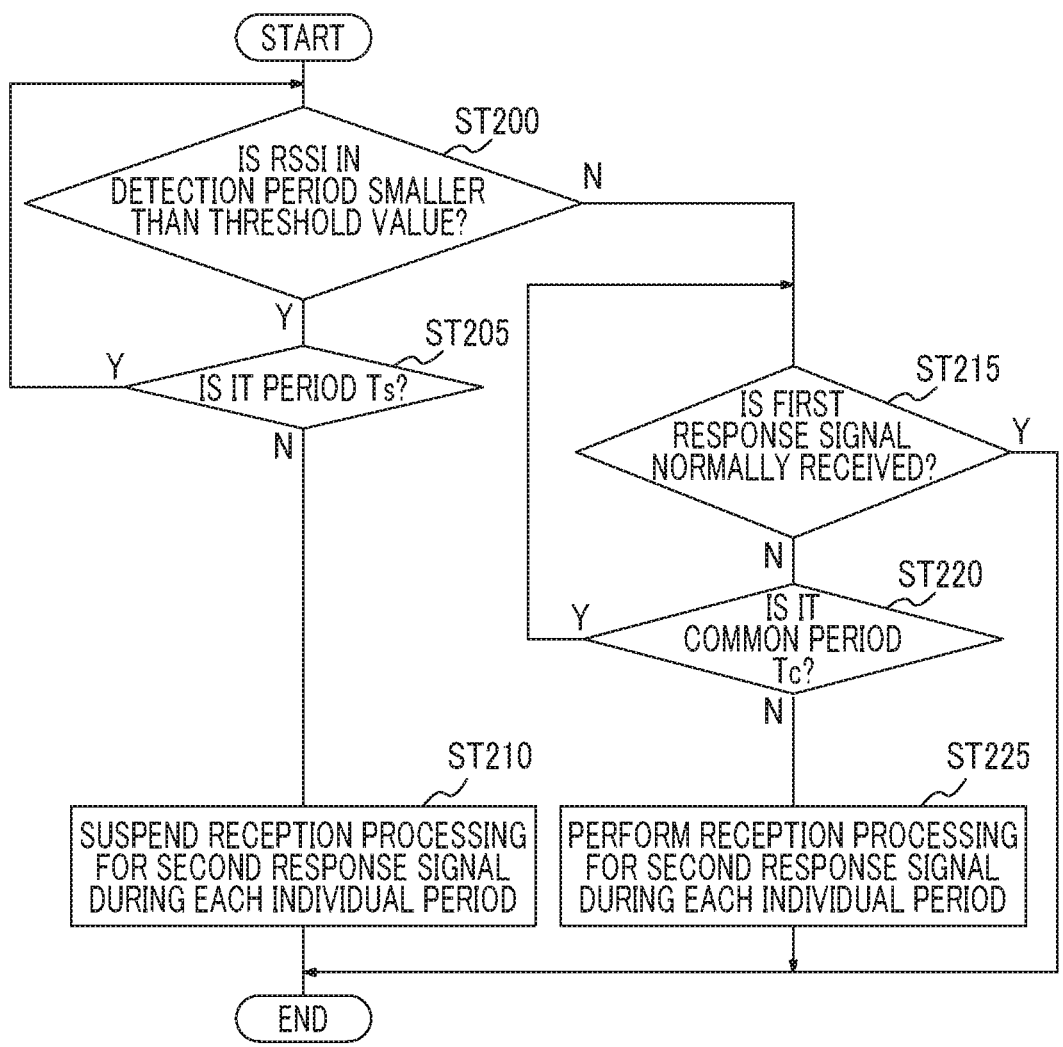
FIG. 9 is a flowchart illustrating specific operations of RF reception processing in FIG. 8.

FIG. 9 is a flowchart illustrating a detailed operation of RF reception processing (ST110) in FIG. 8.

After the request signal is transmitted to the portable device 3, the control device 2 compares a value of received signal strength indication in the first reception unit 22 to a predetermined threshold value during the period Ts (period when the first packet of the first response signal is required to be transmitted) in the common period Tc (ST200 and ST205). In a case where the value of the received signal strength indication in the first reception unit 22 is smaller than the threshold value during the period Ts, the control device 2 suspends reception processing (reception processing for a second packet of the first response signal) during a period in the common period Tc after the period Ts, and suspends reception processing for the second response signal during the individual period Tt (ST210).

In a case where the value of the received signal strength indication in the first reception unit 22 is greater than the threshold value during the period Ts, the control device 2 continuously performs the reception processing for the second packet of the first response signal during the remaining period of the common period Tc (ST215 and ST220). In a case (ST220) where normal reception of the first response signal (first packet and second packet) during the common period Tc is not possible, the control device 2 consecutively performs the reception processing for the second response signal during each of the individual periods Tt, after the reception processing for the first response signal (ST225), and causes the second response signal to be received from each of the portable devices 3. In a case where the first response signal can be received normally during the common period Tc, the control device 2 does not perform the reception processing for the second response signal during each of the individual periods Tt, and cause the process to proceed to Step ST115 (FIG. 8).

As described above, according to the communication system of the embodiment, if the portable device 3 receives a request signal from the control device 2 which requires a response from the portable device 3, a first response signal is transmitted from the portable device 3 during the common period Tc defined in all of the portable devices 3. Thus, in a case where there is no portable device 3 which enables wireless communication with the control device 2, a value of received signal strength indication of a wireless signal which is received from the portable device 3 by the control device 2 is very small and becomes smaller than the threshold value during the common period. In this case, the control device 2 suspends reception processing for receiving a signal required to be transmitted from the plurality of portable devices 3 subsequently to the first response signal. Accordingly, a period of a delay occurring in processing of the control device 2 due to the endlessly continuing reception processing is reduced.

According to the communication system of the embodiment, in a case where there is no portable device 3 which transmits a response to the request signal received by using one antenna, so as to enable wireless communication with the control device 2, the control device 2 suspends the reception processing which is used for receiving a signal from the portable device 3, and is useless in this case, and the control device 2 repeats the transmission processing of transmitting the request signal to the portable devices 3 by using an antenna which is different from the one antenna.

Thus, an antenna which enables transmission of the request signal to the portable devices 3 can be rapidly selected from the plurality of antennae (ANT1 to ANT5). As a result, it is possible to rapidly establish wireless communication between the portable devices 3 and the control device 2, and thus to rapidly perform the vehicle control in accordance with the operation input devices 4 to 6.

Further, according to the communication system of the embodiment, after the transmission processing of transmitting the request signal to the portable device 3 from the control device 2, in a case where normal reception of the first response signal from the portable device 3 during the common period is not possible and the value of the received signal strength indication of a wireless signal received from the portable device 3 is greater than a predetermined threshold value, the first response signal may be simultaneously transmitted from two or more portable devices 3 during the common period. In this case, the control device 2 performs the reception processing for receiving the second response signal required to be transmitted from the plurality of portable devices 3 during the individual periods which do not overlap each other. Thus, the control device 2 can receive the second response signal normally from each of the portable device 3 without the occurrence of reception error due to simultaneous transmission.

According to the communication system of the embodiment, the first response signal is divided into two packets (first packet and second packet), and transmitted from the portable device 3. The control device 2 compares the value of the received signal strength indication in the first reception unit 22 to the predetermined threshold value during the period Ts when the leading packet (first packet) in the first response signal is required to be transmitted. Thus, since the received signal strength indication of which the value exceeds the threshold value is detected during a relatively short period when the leading packet in the first response signal is transmitted, a comparison result between the value of the received signal strength indication in the first reception unit 22 and the threshold value can be obtained at an early timing. That is, since the reception processing can be rapidly suspended in the middle of the common period Tc, it is possible to more reduce a period of a delay occurring in the processing of the control device 2 due to the endlessly continuing reception processing.

Hitherto, the embodiment according to the present invention is described, but the present invention is not limited only to the above embodiment and may include other variations.

Figure 10:
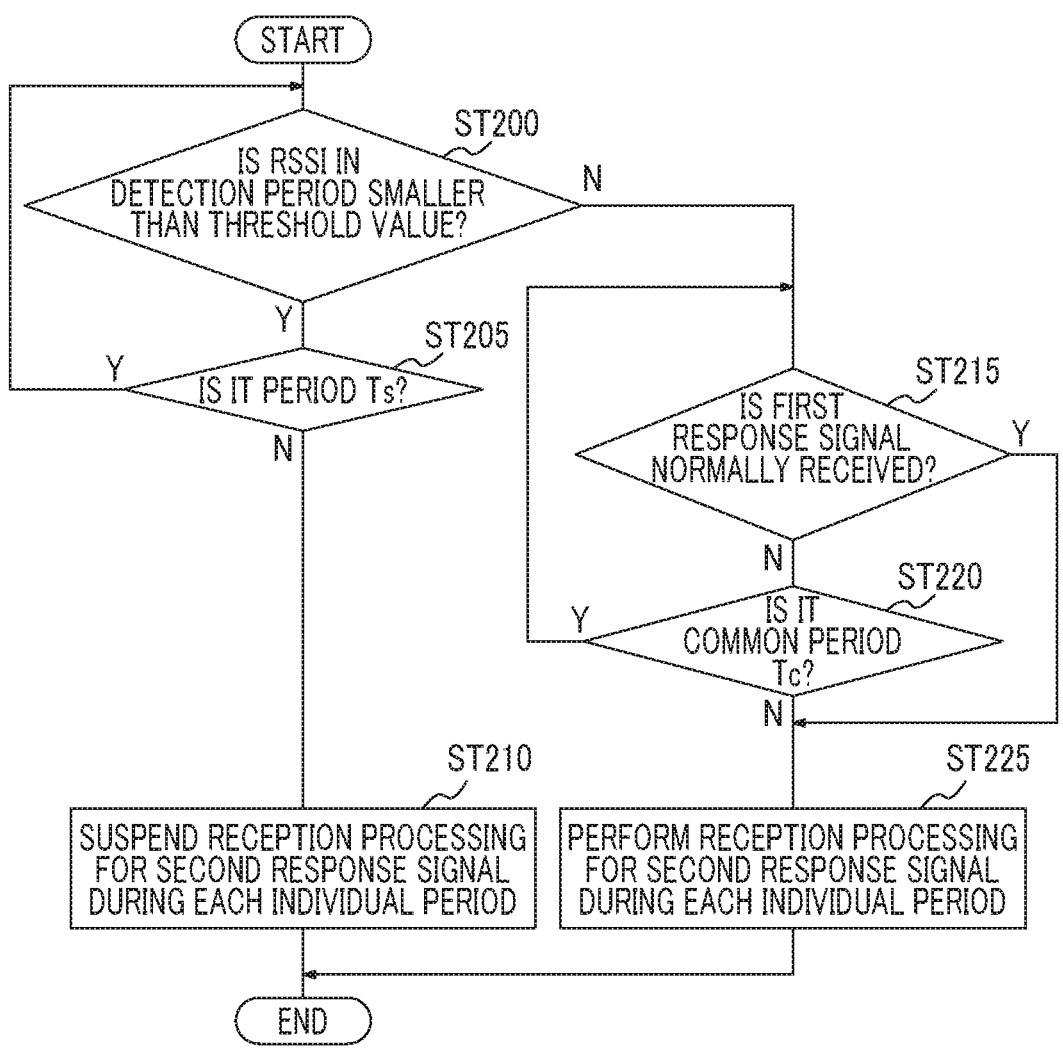
FIG. 10 is a flowchart illustrating a modification example of the RF reception processing illustrated in FIG. 9.

In the above-described embodiment, in a case where the first response signal can be received normally during the common period Tc, that is, in a case where one portable device 3 transmits the first response signal to the request signal, descriptions for the reception processing for the second response signal during each of the individual periods Tt are omitted (ST215 in FIG. 3). However, the present invention is not limited to this example. In another embodiment according to the present invention, as illustrated in the flowchart of FIG. 10, for example, even in a case (ST215) where the first response signal can be received normally during the common period Tc, the reception processing (ST225) for the second response signal may be performed during each of the individual periods Tt. Thus, since the response signal to the request signal, which is transmitted from the portable device 3 is received twice by the control device 2, it is possible to reduce the incidence of the reception errors and to improve stability of communication.

In the above-described embodiment, an example in which the response signal (first response signal and second response signal) which is transmitted to the control device 2 from the portable device 3 is divided into two packet is exemplified. However, the present invention is not limited to this example. That is, the response signal may be divided into three or more packets or may be transmitted in a form of the single packet.

Figure 11:
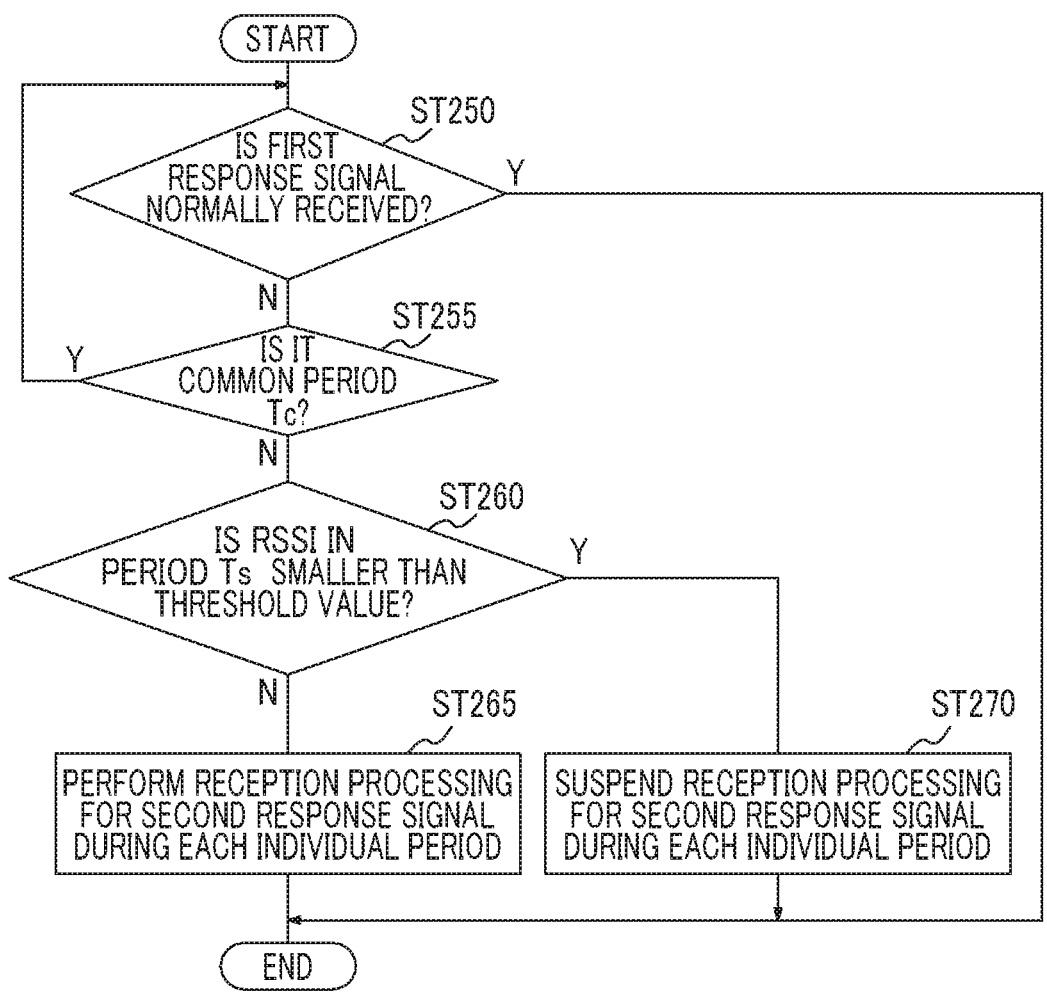
FIG. 11 is a flowchart illustrating another modification example of the reception processing performed by the control device.

In the above-described embodiment, in a case where the value of the received signal strength indication in the first reception unit 22 is smaller than the predetermined threshold value during the period Ts, the reception processing is suspended despite of being in the middle of the common period Tc (ST200, ST205, and ST210 in FIG. 9). However, the present invention is not limited to this example. In another embodiment according to the present invention, for example, as illustrated in the flowchart of FIG. 11, determination of the received signal strength indication may be performed after the common period Tc. In the example of FIG. 11, the control device 2 compares the value of the received signal strength indication in the first reception unit 22 during the common period Tc, to the threshold value in a case (ST250 and ST255) where normal reception of the first response signal is not possible during the common period Tc (ST260). If the value of the received signal strength indication is smaller than the threshold value, the control device 2 suspends the reception processing for the second response signal during each of the individual periods Tt (ST270). If the value of the received signal strength indication is greater than the threshold value, the control device 2 performs the reception processing for the second response signal (ST265). In this manner, in the example of FIG. 11, after it is reliably determined that normal reception of the first response signal is not possible during the common period Tc, the reception processing for the second response signal is suspended based on comparison of the value of the received signal strength indication and the threshold value. Thus, regardless of the presence of the portable device 3 which enables a response to the request signal, it is possible to reduce occurrence of suspension of the reception processing for the second response signal in the middle of the common period Tc, and thus to improve stability of communication.

In the above-described embodiment, the request signal is transmitted to the portable device 3 from the control device 2 in accordance with an operation of the engine start button and the like by a user who holds the portable device 3. However, the present invention is not limited to this example. For example, in a case and the like where a vehicle stops, the request signal may be periodically transmitted from the control device 2, and the control device 2 may perform the vehicle control such as locking or unlocking of a door, in accordance with a response signal to the request signal, which is received from the portable device 3.

The above-described embodiment shows an example of the present invention applied to a passive•keyless entry system. However, the present invention is not limited to this example. That is, the present invention is not limited to a vehicle, and may be widely applied to a communication system in which a control device installed in transportations, mechanical apparatus, housing facilities, and the like performs various types of control based on wireless communication with a portable device.

It should be understood by those skilled in the art that various modifications, combinations, sub-combinations and alterations may occur depending on design requirements and other factors insofar as they are within the scope of the appended claims of the equivalents thereof.

What is claimed is:

1. A communication system in which wireless communication between a control device mounted in a vehicle and a plurality of portable devices is enabled,
wherein the control device comprises:
a plurality of antennas;
a first transmission unit configured to transmit wireless signals to the portable devices;
a first reception unit configured to receive wireless signals from the portable devices; and
a first control unit configured to cause the first transmission unit to perform a transmission of a request signal to request a response from each of the plurality of portable devices,
wherein each of the plurality of portable devices comprises:
a second transmission unit configured to transmit wireless signals to the control device;
a second reception unit configured to receive wireless signals from the control device; and
a second control unit configured to cause the second transmission unit to transmit a first response signal during a common time period commonly defined for all of the portable devices, if the second reception unit receives the request signal,
wherein the first control unit compares, after the request signal was transmitted, a received signal strength in the first reception unit with a threshold value during the common time period, and suspends a reception process for the first reception unit to receive a signal to be transmitted from each of the plurality of portable devices subsequently to the first response signal, if the received signal strength is smaller than the threshold value,
and wherein the first control unit repeats the transmission of the request signal by the first transmission unit using one of the antennas different from an antenna which has been used in the previous transmission of the request signal, if the reception process of the first reception unit was suspended due to the received signal strength smaller than the threshold value.

2. The communication system according to claim 1, wherein:
the second control unit is further configured to cause the second transmission unit to transmit a second response signal during an individual time period individually defined for each of the plurality of portable devices, after the first response signal is transmitted during the common time period, and
the first control unit is further configured to cause the first reception unit to receive the second response signal to be transmitted from each of the plurality of portable devices during the respective individual time period, if the first response signal is not properly received during the common time period after the transmission of the request signal and the received signal strength in the first reception unit during the common time period is greater than the threshold value.

3. The communication system according to claim 2, wherein
the first control unit is further configured to cause the first reception unit to receive the second response signal to be transmitted from each of the plurality of portable devices during the respective individual time period, if the first response signal is properly received by the first reception unit during the common time period after the transmission of the request signal.

4. The communication system according to claim 1, wherein:
the second control unit divides the first response signal into at least two packets and causes the second transmission unit to transmit the at least two packets; and
the first control unit compares the received signal strength in the first reception unit with the threshold value during a time period in which a leading packet of the at least two packets in the first response signal is to be transmitted within the common time period.

5. A control device mounted in a vehicle, the control device comprising:
a plurality of antennas;
a first transmission unit configured to transmit wireless signals to a plurality of portable devices;
a first reception unit configured to receive wireless signals from each of the plurality of portable devices; and
a first control unit configured to cause the first transmission unit to perform a transmission of a request signal for requiring a response from each of the plurality of portable devices, to compare a received signal strength in the first reception unit with a threshold value during a common time period after the request signal is transmitted, all of the plurality of portable devices transmitting a first response signal in response to the request signal during the common time period if the request signal is received, and to suspend a reception process in the first reception unit to receive a signal to be transmitted from each of the plurality of portable devices subsequently to the first response signal, if the received signal strength is smaller than the threshold value during the common time period,
wherein the first control unit is further configured to repeat the transmission of the request signal using one of the antennas different from an antenna which has been used in the previous transmission of the request signal, if the reception process is suspended due to the received signal strength smaller than the threshold value.

6. The control device according to claim 5, wherein
the first control unit is further configured to cause the first reception unit to receive a second response signal to be transmitted from each of the plurality of portable devices during an individual time period individually defined for each of the portable devices, if the first response signal is not properly received during the common time period and the received signal strength in the first reception unit is greater than the threshold value during the common time period.

7. A method for providing wireless communication between a control device having a plurality of antennas and mounted in a vehicle and a plurality of portable devices, the method comprising:
causing the control device to perform a transmission of a request signal for requiring a response from each of the plurality of portable devices;
transmitting a first response signal, in response to the request signal, from the plurality of portable devices during a common time period commonly defined for all of the plurality of portable devices;
causing, after the transmission of the request signal, the control device to compare a received signal strength of wireless signals received from the plurality of portable devices during the common time period with a threshold value, and to suspend a reception process for receiving a signal to be transmitted from each of the plurality of portable devices subsequently to the first response signal, if the received signal strength is smaller than the threshold value during the common time period; and causing the control device to repeat the transmission of the request signal using one of the antennas different from an antenna which has been used in the previous transmission of the request signal, if the reception process is suspended due to the received signal strength smaller than the threshold value.

\* \* \* \* \*